(12) United States Patent
Jun et al.

(10) Patent No.: US 12,467,946 B2
(45) Date of Patent: Nov. 11, 2025

(54) TEST SOCKET

(71) Applicant: okins electronics Co., Ltd, Gyeonggi-do (KR)

(72) Inventors: Jin Kook Jun, Gyeonggi-do (KR); Chan Ho Lee, Gyeonggi-do (KR); Jae Hyun Seo, Gyeonggi do (KR)

(73) Assignee: okins electronics Co., Ltd, Gyeonggi-Do (KR)

( * ) Notice: Subject to any disclaimer, the term of this patent is extended or adjusted under 35 U.S.C. 154(b) by 195 days.

(21) Appl. No.: 18/218,029

(22) Filed: Jul. 4, 2023

(65) Prior Publication Data

US 2024/0159794 A1 May 16, 2024

(30) Foreign Application Priority Data

Jul. 4, 2022 (KR) ........................ 10-2022-0081998

(51) Int. Cl.
*G01R 1/04* (2006.01)
*G01R 1/02* (2006.01)
*G01R 1/067* (2006.01)
*G01R 1/073* (2006.01)
*G01R 31/26* (2020.01)
*G01R 31/28* (2006.01)

(52) U.S. Cl.
CPC ....... *G01R 1/0466* (2013.01); *G01R 31/2886* (2013.01)

(58) Field of Classification Search
CPC . G01R 1/02; G01R 1/04; G01R 1/067; G01R 1/073; G01R 31/00; G01R 31/02; G01R 31/26; G01R 31/28
See application file for complete search history.

(56) References Cited

U.S. PATENT DOCUMENTS

| | | | | |
|---|---|---|---|---|
| 5,975,915 | A * | 11/1999 | Yamazaki | G01R 1/0433 439/91 |
| 6,033,235 | A * | 3/2000 | Ikeya | G01R 1/0483 439/71 |
| 9,755,387 | B2 * | 9/2017 | Hachuda | H01L 23/4006 |
| 2006/0051995 | A1 * | 3/2006 | Piatti | G01R 1/0483 439/166 |
| 2017/0017649 | A1 | 1/2017 | Srinivasaraghavan | |
| 2022/0397598 | A1 | 12/2022 | Takahashi | |

FOREIGN PATENT DOCUMENTS

| | | |
|---|---|---|
| CN | 114204308 A | 3/2022 |
| JP | 2001228204 A | 8/2001 |
| KR | 20030044827 A | 6/2003 |
| KR | 20110003836 A | 1/2011 |
| WO | WO-0161364 A2 * | 8/2001 ........... G01R 1/0483 |

* cited by examiner

*Primary Examiner* — Neel D Shah
(74) *Attorney, Agent, or Firm* — Bayramoglu Law Offices LLC

(57) ABSTRACT

A test socket is provided. According to an aspect of the present invention, provided is a test socket energizably connected to a semiconductor device to electrically test the semiconductor device, the test socket including a base on which a seating part on which the semiconductor device is seated is formed and a test pin protruding from the seating part in one direction, the test pin contactable with a conductive part of the semiconductor device; a cover capable of reciprocating a first position located at an end of the base in one direction and a second position located apart from the first position in the one direction; and a support member coupled to the base and supporting an outer surface of the cover.

10 Claims, 7 Drawing Sheets

TEST SOCKET

CROSS-REFERENCE TO RELATED APPLICATION

This application claims priority to and the benefit of Korean Patent Application No. 10-2022-0081998, filed on Jul. 4, 2022, the disclosure of which is incorporated herein by reference in its entirety.

TECHNICAL FIELD

The present invention relates to a test socket, and more particularly, to a test socket for fixing a semiconductor device to electrically test a circuit formed in the semiconductor device.

BACKGROUND

In general, a semiconductor device manufactured through a complicated process is inspected for characteristics and defective states by various electrical tests.

Specifically, in the electrical test of a semiconductor device such as a semiconductor integrated circuit device such as a package IC and an MCM, and a wafer having an integrated circuit formed thereon, the semiconductor device is seated in a test socket in which a tester is installed, so as to electrically connect a conductive part and a test pin of a test device to each other as terminals formed on one surface of the semiconductor device to be inspected.

As the integration of semiconductor devices has recently developed, the time required to inspect one semiconductor device has increased. Accordingly, in the industry, a plurality of semiconductor devices are simultaneously tested to increase the inspection efficiency of the semiconductor device.

That is, the test efficiency of the semiconductor device is determined according to the number of test sockets provided. However, since a space for testing semiconductor devices is limited, it is necessary to minimize the size of test sockets in order to increase the number of semiconductor devices inspected.

However, when the size of the test socket is minimized, the outer wall of the test socket inevitably becomes thinner, causing a problem in that the test socket is deformed or damaged during a semiconductor device inspection process.

Therefore, there is a need for a test socket capable of testing semiconductor devices without deformation of or damage to the test socket while minimizing the size of the test socket.

SUMMARY OF THE INVENTION

Technical Problem

The present invention is to solve the above problems, and the present invention is directed to providing a test socket in which a first guide part and a second guide part of a cover are not damaged even when the thickness of the outer wall of the cover is made thin.

The present invention is directed to providing a test socket capable of stably supporting the up-down motion of a cover.

The problems of the present invention are not limited to those mentioned above, and other problems not mentioned will be clearly understood by those of ordinary skill in the art from the following description.

Technical Solution

According to an aspect of the present invention, provided is a test socket energizably connected to a semiconductor device to electrically test the semiconductor device, the test socket including a base on which a seating part on which the semiconductor device is seated is formed and a test pin protruding from the seating part in one direction, the test pin contactable with a conductive part of the semiconductor device; a cover capable of reciprocating a first position located at an end of the base in one direction and a second position located apart from the first position in the one direction; and a support member coupled to the base and supporting an outer surface of the cover.

In this case, the cover may include a cover body; a through part formed through the cover body in the one direction so that the semiconductor device can be seated in the seating part; and a first guide part extending from one side of the cover body to the other direction, and the base may include a base body having the seating part formed on one surface thereof; and a first guide groove recessed from an outer surface of one side of the base body to guide the motion in one direction or the other direction by inserting the first guide part.

In this case, the support member may include a first support part disposed to support an outer surface of the first guide part and an outer surface of the base body while the cover reciprocates between the first position and the second position.

In this case, the cover body and the first guide part may be integrally formed by injection molding.

In this case, the cover may further include a guide protrusion protruding from an inner surface of the first guide part and extending in the one direction and the base may further include a second guide groove further recessed from the first guide groove to guide the motion in the one direction or the other direction by inserting the guide protrusion.

In this case, the support member may be formed to surround outer surfaces of the cover and the base.

In this case, the support member may extend in the one direction to an end of the cover in the one direction in a state where the cover is located in the second position.

In this case, the support member may further include a latching protrusion protruding from the inner surface, and the base may further include a latching groove into which the latching protrusion is inserted so that the support member is fixed to the base.

In this case, the support member may further include an elastic providing hole disposed to surround a part of a circumference of the latching protrusion so that the latching protrusion can be inserted into the latching groove.

In this case, the cover may include a second guide part extending in the other direction from the other side of the cover body, the base may further include a third guide groove recessed from an outer surface of the other side of the base body to guide the motion in the one direction or the other direction by inserting the second guide part, and the support member may include a second support part disposed to support an outer surface of the second guide part and an outer surface of the base body while the cover reciprocates between the first position and the second position.

In this case, the support member may be formed of a material having greater strength than that of the first guide part.

In this case, an elastic member disposed between the cover and the base to elastically press the cover in the one direction may be further included.

Advantageous Effects

The test socket according to an embodiment of the present invention provides a support member for supporting the first guide part and the second guide part of the cover, and thus, even when the thickness of the outer wall of the cover is made thin, the first guide part and the second guide part of the cover cannot be damaged, and space utilization can be maximized by narrowing the gap between the test sockets.

The test socket according to an embodiment of the present invention can stably support the up-down motion of the cover by making the support member of a material having greater strength than the strength of the cover.

Advantageous effects of the present invention are not limited to the above-described effects, and should be understood to include all effects that can be inferred from the configuration of the invention described in the description or claims of the present invention.

DETAILED DESCRIPTION OF THE EMBODIMENTS

Figure 1:
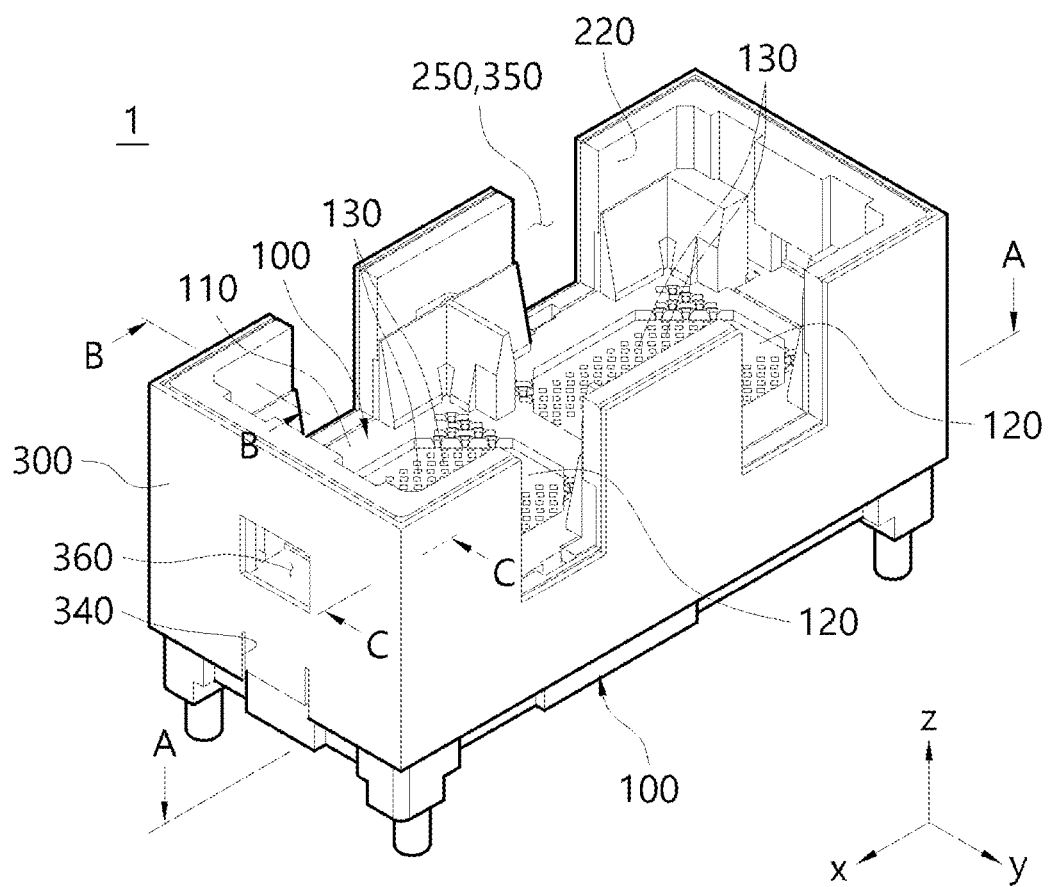
FIG. 1 is a perspective view of a test socket according to an exemplary embodiment of the present invention.

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention, and throughout the specification, like reference numerals denote like elements.

Terms and words used in the present specification and claims should not be construed as limited to their usual or dictionary definition, and they should be interpreted as a meaning and concept consistent with the technical idea of the present invention based on the principle that inventors may appropriately define the terms and concept in order to describe their own invention in the best way.

Accordingly, the embodiments described in the present specification and the configurations shown in the drawings correspond to preferred embodiments of the present invention, and do not represent all the technical idea of the present invention, so the configurations may have various examples of equivalent and modification that can replace them at the time of filing the present invention.

It should be understood that the terms "comprise" or "have" or the like when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Figure 2:
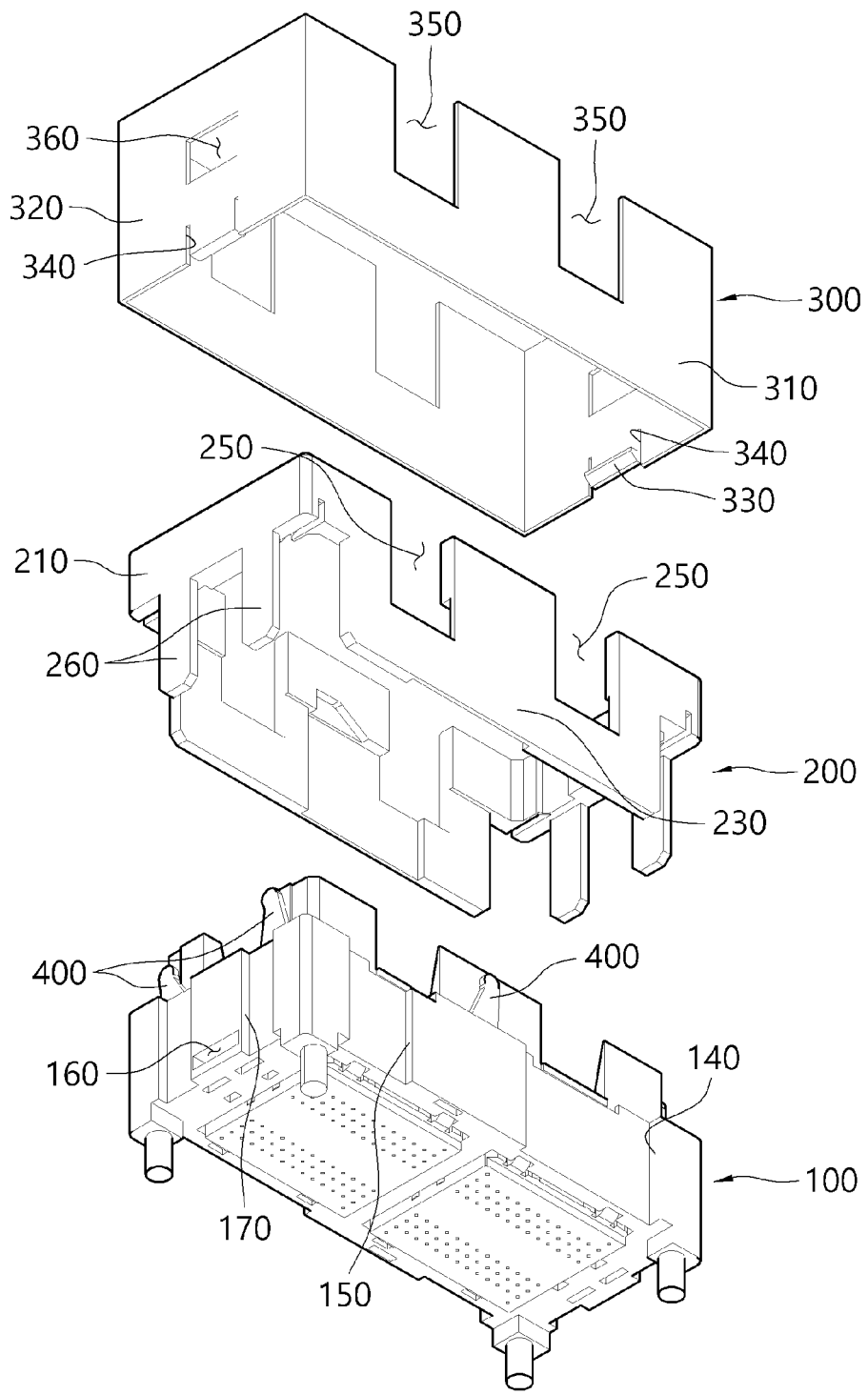
FIG. 2 is an exploded perspective view of a test socket according to an exemplary embodiment of the present invention.
Figure 3:
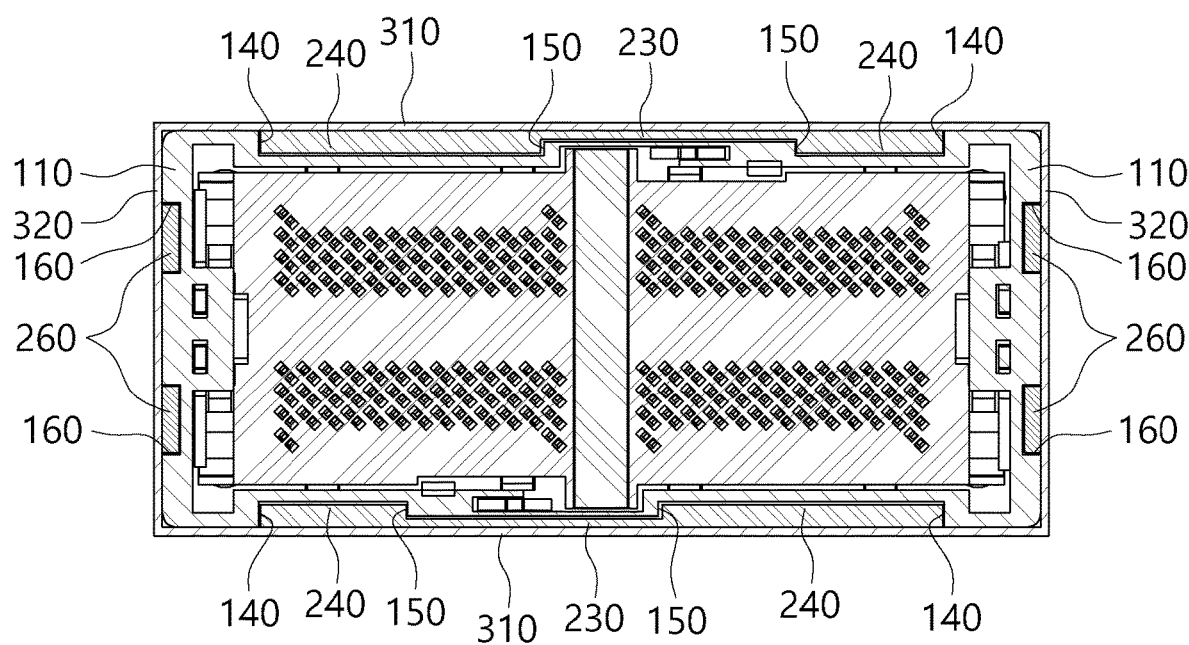
FIG. 3 is a cross-sectional view illustrating a cross-section taken along line A-A of FIG. 1.
Figure 4:
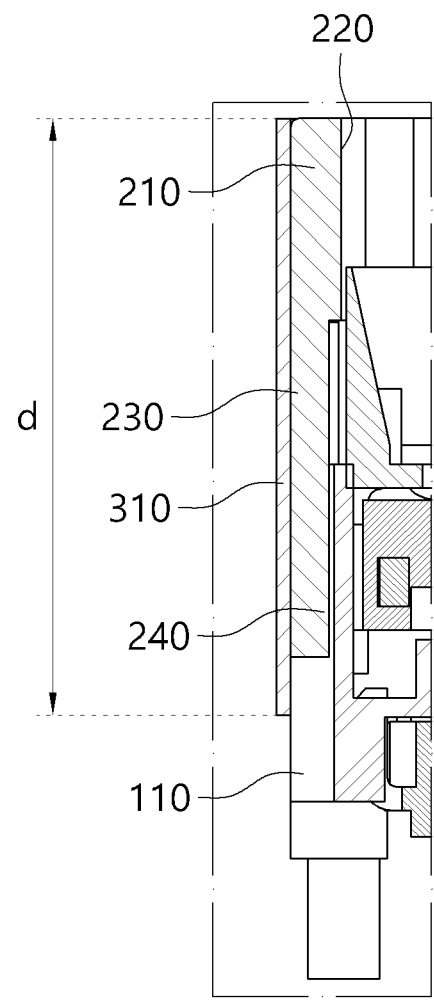
FIG. 4 is a cross-sectional view illustrating a cross-section taken along line B-B of FIG. 1.
Figure 5:
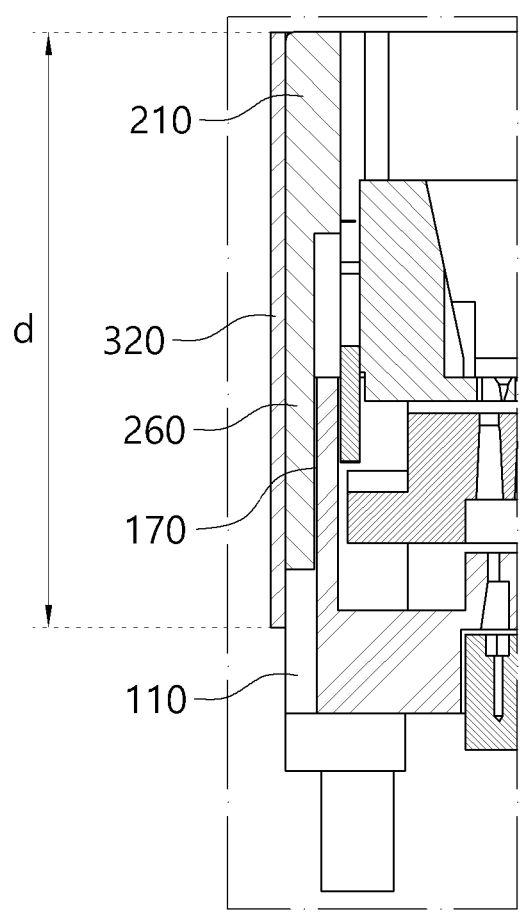
FIG. 5 is a cross-sectional view illustrating a cross-section taken along line C-C of FIG. 1.
Figure 6:
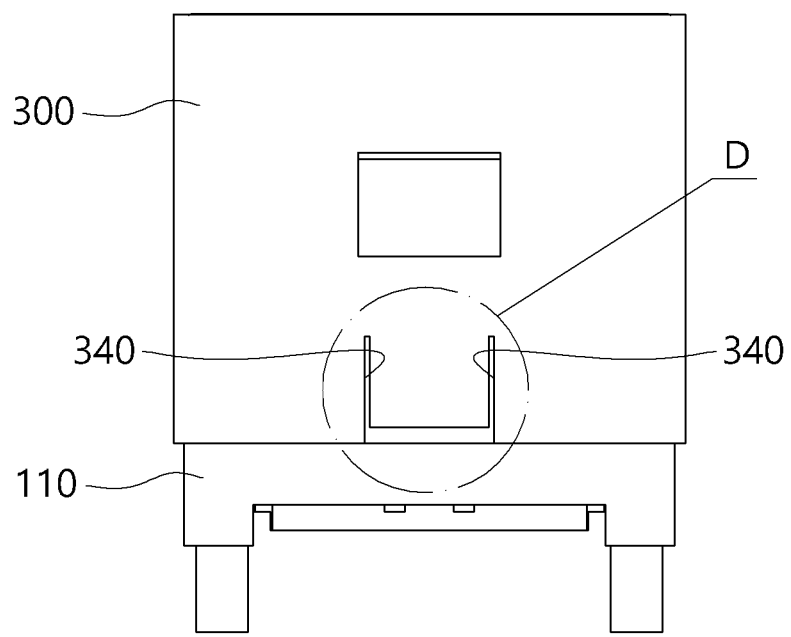
FIG. 6 is a side view of a test socket according to an exemplary embodiment of the present invention.
Figure 7:
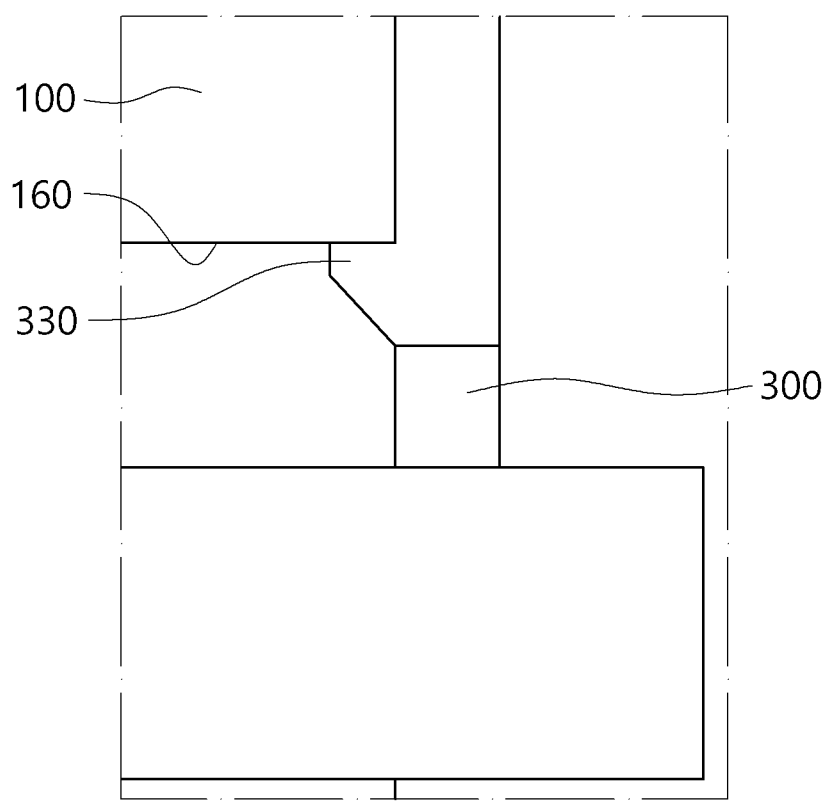
FIG. 7 is a cross-sectional view illustrating a cross-section of area D of FIG. 6.

A description of the reference numerals used in the FIGS. is as follows:

1: test socket
100: base
110: base body
111: guide wall
120: seating part
130: test pin
140: first guide groove
150: second guide groove
160: latching groove
170: third guide groove
200: cover
210: cover body
220: through part
230: first guide part
240: guide protrusion
250: cover ventilation part
260: second guide part
300: support member
310: first support part
320: second support part
330: latching protrusion
340: elastic providing hole
350: first support member ventilation
360: second support member ventilation
400: elastic member Hereinafter, a test socket according to an exemplary embodiment of the present invention will be described with reference to the accompanying drawings. FIG. 1 is a perspective view of a test socket according to an exemplary embodiment of the present invention. FIG. 2 is an exploded perspective view of a test socket according to an exemplary embodiment of the present invention. FIG. 3 is a cross-sectional view illustrating a cross-section taken along line A-A of FIG. 1. FIG. 4 is a cross-sectional view illustrating a cross-section taken along line B-B of FIG. 1. FIG. 5 is a cross-sectional view illustrating a cross-section taken along line C-C of FIG. 1. FIG. 6 is a side view of a test socket according to an exemplary embodiment of the present invention. FIG. 7 is a cross-sectional view illustrating a cross-section of area D of FIG. 6. In this case, the direction in which the X-axis of FIG. 1 is directed is defined as the right direction, the direction in which the Y-axis is directed is defined as the forward direction, and the direction in which the Z-axis is directed is defined as the upward direction.

The test socket 1 according to an embodiment of the present invention serves to fix a semiconductor device and a tester to be connected energizably in the process of transmitting and receiving test signals to and from the semiconductor device (not shown) such as a semiconductor integrated circuit device such as a package IC, an MCM, or a wafer having an integrated circuit to test whether the semiconductor device is normally operating.

In this case, the test socket 1 may include a tester capable of transmitting and receiving test signals to and from the semiconductor device to test the semiconductor device. That is, a tester may be included in a base 100 to be described later. However, since the main feature of the present invention lies in the support member 300 stably supporting the movement of the cover 200, the following will focus on the relationship between the cover 200 and the support member 300.

As shown in FIGS. 1 and 2, the test socket 1 according to an embodiment of the present invention includes a base 100, a cover 200, a support member 300 and an elastic member 400.

As shown in FIGS. 1 and 2, a seating part 120 on which a semiconductor device is seated is formed on the upper surface of the base 100. The semiconductor device is formed in a plate shape, and is seated on the seating part 120 with one surface of the plate-shaped semiconductor device facing the seating part 120.

A test pin 130 that can contact a conductive part (not shown) formed on one surface of the semiconductor device is provided in the base 100. In this case, the test pin 130 protrudes upward from the seating part 120 to come into contact with the conductive part of the semiconductor device.

Although not shown in the drawings, a plurality of conductive parts may be disposed on one surface of the semiconductor device, and the test pins 130 provided on the seating part 120 may be disposed to correspond to the number of conductive parts.

In this case, the shape of the conductive part contacting the test pin 130 or the material forming the conductive part is not limited, and various known shapes or materials may be used.

As shown in FIG. 2, the base 100 includes a base body 110 in a hexahedral shape in which the seating part 120 is formed on the upper surface. The base body 110 does not have to be formed in the shape of a hexahedron as long as it extends in the up-down direction, but may be formed in various pillar shapes.

A plurality of seating parts 120 formed on the base body 110 may be provided. That is, as shown in FIG. 1, two seating parts 120 may be formed on one base body 110, and thus, two semiconductor devices may be simultaneously tested with one test socket 1.

Although not shown in the drawings, inside the base body 110, a tester capable of transmitting an electrical signal to a semiconductor device and receiving an electrical signal that has passed through the semiconductor device is disposed. The tester is energizably connected to the semiconductor device through the test pin 130.

As shown in FIG. 1, a guide wall 111 for guiding the semiconductor device may protrude upward around the seating part 120 of the base body 110. The guide wall 111 may be integrally formed along the circumference of the seating part 120, or may be formed on a part of the circumference along the circumference.

The guide wall 111 may have a thinner thickness toward the upper side so as to easily guide the semiconductor device to the seating part. Accordingly, an inclined surface may be formed on the seating part 120 side of the guide wall 111.

As shown in FIGS. 1 and 2, the cover 200 is disposed above the base 100. The cover 200 reciprocates between a first position located at the upper end of the base 100 and a second position located above the first position and spaced apart from the first position.

As the cover 200 reciprocates up and down between the first position and the second position, the cover 200 presses the other surface of the semiconductor device so that the conductive part of the semiconductor device can sufficiently contact the test pin 130 in a state where the semiconductor device is seated on the seating part 120, or provides a space for the semiconductor device to be seated on or removed from the seating part 120.

To this end, a latch (not shown) may be coupled to the cover 200 of the test socket 1 according to an embodiment of the present invention. The latch may press the semiconductor device toward the seating part 120 in a state where the cover 200 is positioned in the first position or the second position. As a mechanism by which the latch can press the semiconductor device, various well-known mechanisms may be used. A detailed description thereof is omitted in this specification.

As shown in FIGS. 1 and 2, the cover 200 of the test socket 1 according to an embodiment of the present invention includes a cover body 210 and a through part 220.

The cover body 210 is formed to correspond to the base body 110. A through part 220 penetrating in the up-down direction is formed in the central part of the cover body 210. The through part 220 provides a passage through which the semiconductor device can be seated on the seating part 120 of the base body 110. That is, the semiconductor device passes through the through part 220 and moves to the seating part 120.

As shown in FIG. 2, the inner surface of the through part 220 formed in the cover body 210 may come into contact with the guide wall 111. The guide wall 111 extends in the up-down direction along the inner surface of the through part 220. The cover body 210 is guided more stably when moving in the up-down direction by the outer surface of the guide wall 111.

The cover 200 of the test socket 1 according to a modified embodiment of the present invention may be formed so that the outer surface of the base body 110 can come into contact with the inner surface of the through part 220 of the cover body 210. That is, when the cover body 210 is in the first position, the lower end of the cover body 210 and the upper end of the base body 110 may be partially overlapped.

As shown in FIGS. 1 and 2, the support member 300 is disposed on outer surfaces of the base 100 and the cover 200. The support member 300 serves to prevent separation of the cover 200 and guide the movement of the cover 200 while the cover 200 reciprocates between the first position and the second position with respect to the base 100.

In this case, the support member 300 is coupled to and fixed to the base body 110. That is, the support member 300 and the base 100 are fixed, and only the cover 200 moves relatively.

To this end, as shown in FIG. 3, the support member 300 is formed to surround the upper surface disposed around the cover body 210 and the base body 110. The support member 300 is formed in a tubular shape, and the inner surface of the support member 300 is formed to correspond to the outer surface of the cover body 210 so that in a state in which the cover 200 and the base 100 are coupled, the support member 300 can guide the movement of the cover 200 in a state fixed by the base 100.

The length d in the up-down direction of the support member 300 is not limited. In other words, as long as the support member 300 can support the motion of the cover 200 by supporting a part of the outer surface of the cover body 210 in a state where the lower end is fixed to the base body 110, the length to which the upper side extends is not limited. In this embodiment, as shown in FIGS. 4 and 5, the upper end of the support member 300 extends upward to reach the upper end of the cover body 210 in a state where the cover 200 is located in the second position. Through this, the motion of the cover 200 can be more stably supported.

In particular, it is possible to prevent the cover 200 from moving in an inclined state while the cover 200 moves in the up-down direction. Through this, contact between the semiconductor device and the tester may be increased by pressing the semiconductor device toward the seating part 120 with a uniform force.

The shape of the support member 300 is not limited as long as it can guide the cover 200 while supporting the motion of the cover 200. As shown in FIG. 2, the support member 300 is formed in a quadrangular tubular shape, and the cover 200 and the base 100 may be sequentially disposed therein from above. In this case, the thickness of the support member 300 may be formed uniformly, and the size of the thickness may be 0.2 mm or more and 0.6 mm or less.

As shown in FIG. 2, the elastic member 400 presses the cover 200 upward so that the cover 200 can be located in the second position in a situation where no external force is applied to the cover 200.

As long as the elastic member 400 can press the cover 200 upward, there are no limitations on the location and the pressing structure. For example, it may be a spring disposed between the cover body 210 and the base body 110, and as shown in FIG. 2, it may be a structure that presses the cover body 210 to one end using a pivotally rotating member.

Meanwhile, in order to guide the up-down motion of the cover 200, the test socket 1 according to an embodiment of the present invention includes a first guide groove 140, a first guide part 230, and a first support part 310.

As shown in FIGS. 2 and 3, the first guide groove 140 is formed by being recessed in the outer surface of the base body 110. More specifically, the first guide groove 140 is formed on the front surface of the base body 110. In addition, the first guide groove 140 may be formed in plurality. Accordingly, the first guide groove 140 may be formed to face each other on the front and rear surfaces. The first guide groove 140 is formed to extend in the up-down direction. The width of the first guide groove 140 in the left-right direction is formed uniform.

The first guide part 230 is inserted into the first guide groove 140. In this case, as shown in FIG. 2, the first guide part 230 is formed extending downward from the cover body 210. The first guide part 230 is inserted into the first guide groove 140 and moves up and down along the extension direction of the first guide groove 140.

The first guide part 230 may be formed in plurality like the first guide groove 140. In this case, the first guide part 230 and the first guide groove 140 are formed in corresponding numbers, and each first guide part 230 is inserted into each first guide groove 140.

The plurality of first guide parts 230 may be disposed to face each other on the front and rear sides of the cover body 210 like the first guide groove 140. That is, a pair of first guide parts 230 and a pair of first guide grooves 140 may be disposed to face each other with the through part 220 of the cover 200 and the seating part 120 of the base 100 interposed therebetween, respectively.

As the pair of first guide parts 230 and the pair of first guide grooves 140 are disposed facing each other in the front-rear direction, it is possible to prevent the cover 200 from tilting in the front-rear direction while the cover 200 moves in the up-down direction.

A cross-section perpendicular to the up-down direction of the first guide part 230 may be formed to be the same as a cross-section perpendicular to the up-down direction of the first guide groove 140. When the first guide part 230 is inserted into the first guide groove 140, there may be no step difference between the outer surface of the first guide part 230 and the outer surface of the base body 110. Accordingly, even though the inner surface of the support member 300 is simply manufactured without a step difference, the cover 200 can be guided using the support member 300.

The cover body 210 and the first guide part 230 may be integrally formed by injection molding. That is, the cover 200 can be easily manufactured even if a separate first guide part 230 is not coupled to the cover body 210.

As shown in FIGS. 3 and 4, the support member 300 includes a first support part 310 to support the outer surface of the first guide part 230. In a state where the first guide part 230 is inserted into the first guide groove 140, the first support part 310 is in contact with the outer surface of the base body 110 at the same time except for the outer surface of the first guide part 230 and the first guide groove 140.

The first support part 310 is not limited in shape as long as it can support the first guide part 230 as a part of the support member 300. For example, as shown in FIG. 3, it may be a front side part and a rear side part of a quadrangular tubular support member 300.

Since the first support part 310 additionally supports the outer surface of the first guide part 230, it is possible to additionally prevent the cover body 210 from being partially tilted in the front-rear direction while moving in the up-down direction.

In addition, since the first support part 310 is provided, it is possible to prevent the first guide part 230 from being deformed or damaged while the cover body 210 is tilted in the front-rear direction. More specifically, it serves to reinforce the rigidity of the first guide part 230, which inevitably becomes thinner in the process of manufacturing the test socket 1 as small as possible in order to simultaneously test a large amount of semiconductor devices.

In particular, as in the present embodiment, when the thickness of the first guide part 230 is manufactured to be 0.3 mm to 1 mm, the first guide part 230 is easily damaged due to bending deformation in the front-rear direction, and thus, it is necessary to reinforce the first guide part 230 with the support member 300.

To this end, the support member 300 including the first support part 310 is formed of a material having greater strength than that of the cover 200, more specifically, the first guide part 230 of the cover 200. For example, the first support part 310 may be formed of stainless steel. However, the support member 300 is not necessarily formed of stainless steel, and the material is not limited as long as it has a strength greater than that of the first guide part 230 so as to assist the first guide part 230.

Meanwhile, as shown in FIGS. 3 and 4, a guide protrusion 240 may be formed to protrude from the inside of the first guide part 230. The guide protrusion 240 extends in the up-down direction so that it does not prevent the first guide part 230 from being guided by the first guide groove 140.

In this case, the guide protrusion 240 is inserted into and guided by a second guide groove 150 formed by being additionally recessed into the first guide groove 140. That is, the first guide groove 140 and the second guide groove 150 are formed with a step difference equal to the protrusion thickness of the guide protrusion 240.

Since the guide protrusion 240 and the second guide groove 150 are formed, it is possible to further prevent the first guide part 230 from tilting in the left-right direction while being guided by the first guide groove 140. That is, the left and right outer surfaces of the guide protrusion 240 and the left and right inner surfaces of the second guide groove 150 come into contact to prevent the cover 200 from tilting in the left-right direction while moving up and down.

Meanwhile, in order to guide the up-down motion of the cover 200, the test socket 1 according to an embodiment of the present invention may further include a third guide groove 170, a second guide part 260, and a second support part 320.

As shown in FIGS. 2 and 3, the third guide groove 170 is formed by being recessed in the other outer surface of the base body 110 where the first guide groove 140 is not formed. More specifically, the third guide groove 170 is formed on the left surface of the base body 110. In addition, the third guide groove 170 may be formed in plurality. Accordingly, the third guide groove 170 may be formed to face each other on the left and right surfaces. The third guide groove 170 is formed to extend in the up-down direction. The width of the third guide groove 170 in the left-right direction is formed uniform.

The second guide part 260 is inserted into the third guide groove 170. In this case, as shown in FIG. 2, the second guide part 260 is formed to extend downward from the other part of the cover body 210 where the first guide part 230 is not formed. The second guide part 260 is inserted into the third guide groove 170 and moves up and down along the extension direction of the third guide groove 170.

The second guide part 260 may be formed in plurality like the third guide groove 170. In this case, the second guide part 260 and the third guide groove 170 are formed in corresponding numbers, and each second guide part 260 is inserted into each third guide groove 170.

The plurality of second guide parts 260 may be disposed to face each other on the left and right sides of the cover body 210 like the third guide groove 170. As shown in FIG. 2, the two pairs of second guide parts 260 and the two pairs of third guide grooves 170 may be disposed to face each other with the through part 220 of the cover 200 and the seating part 120 of the base 100 interposed therebetween, respectively.

As the two pairs of second guide parts 260 and the two pairs of third guide grooves 170 are disposed facing each other in the left-right direction, it is possible to prevent the cover 200 from tilting in the left-right direction while the cover 200 moves in the up-down direction. Therefore, by providing both the first guide part 230 and the second guide part 260, the cover 200 can perform a reciprocating motion in the up-down direction without having an inclination with respect to a surface perpendicular to the up-down direction.

A cross-section perpendicular to the up-down direction of the second guide part 260 may be formed to be the same as a cross-section perpendicular to the up-down direction of the third guide groove 170. When the second guide part 260 is inserted into the third guide groove 170, there may be no step difference between the outer surface of the second guide part 260 and the outer surface of the base body 110. Accordingly, even though the inner surface of the support member 300 is simply manufactured without a step difference, the cover 200 can be guided using the support member 300.

The cover body 210 and the second guide part 260 may be integrally formed by injection molding. That is, the cover 200 can be easily manufactured even if a separate second guide part 260 is not coupled to the cover body 210.

As shown in FIGS. 3 and 5, the support member 300 includes a second support part 320 to support the outer surface of the second guide part 260. In a state where the second guide part 260 is inserted into the third guide groove 170, the second support part 320 is in contact with the outer surface of the base body 110 at the same time except for the outer surface of the second guide part 260 and the third guide groove 170.

The second support part 320 is not limited in shape as long as it can support the second guide part 260 as a part of the support member 300. For example, as shown in FIG. 3, it may be a left side part and a right side part of a quadrangular tubular support member 300.

Meanwhile, the test socket 1 according to an embodiment of the present invention includes a latching protrusion 330 and a latching groove 160 to fix the support member 300 to the base 100.

As shown in FIGS. 2 and 7, the latching protrusion 330 is formed to protrude from the inner surface of the support member 300, and the latching groove 160 is formed to be recessed into the outer surface of the base body 110. Accordingly, the latching protrusion 330 is seated in the latching groove 160 so that the support member 300 can be fixed to the base 100.

In this case, the latching protrusion 330 and the latching groove 160 are disposed at positions corresponding to each other. In particular, in a state where the latching protrusion 330 is inserted into the latching groove 160, the latching groove 160 is formed such that the height of the upper end of the support member 300 is the same as the height of the upper end of the cover 200 located in the second position. However, there is no limitation on the positions where the latching groove 160 and the latching protrusion 330 that satisfy the above conditions are formed.

The latching protrusion 330 and the latching groove 160 may be formed in plural or, more specifically, in pairs. When the latching protrusion 330 and the latching groove 160 are formed in pairs, they may be formed to face each other.

In this embodiment, the latching groove 160 is formed on the left and right surfaces of the base body 110. In addition, corresponding thereto, the latching protrusion 330 is formed as a pair on the inner surface of the second support part 320 of the support member 300. Through this, the latching protrusions 330 protrude toward each other, so that in a state in which the latching protrusion 330 is seated in the latching groove 160, by the first support part 310 of the support member 300, the latching protrusion 330 can firmly maintain a seated state without being separated from the latching groove 160.

As shown in FIGS. 2 and 6, in order for the latching protrusion 330 to be seated in the latching groove 160, an elastic providing hole 340 may be formed around the latching protrusion 330. The elastic providing hole 340 allows the side portion of the support member 300 to support the latching protrusion 330 to be elastically deformed in the process of coupling the base 100 to the support member 300.

To this end, the elastic providing hole 340 may be formed in a U shape with an open upper side. In this case, the support member 300 is coupled to the base 100 while moving from the upper side to the lower side.

In addition, as shown in FIG. 7, an inclined surface may be formed at the fore-end of the latching protrusion 330 so that the support member 300 is moved from the upper side to the lower side to be easily moved along the outer surface of the base body 110 without being damaged in the process of being coupled to the base 100.

Meanwhile, in order to circulate heat that may be generated in the process of inspecting a semiconductor device to the outside, the test socket 1 according to an embodiment of the present invention may include a cover ventilation part 250 and a first support member ventilation part 350.

As shown in FIGS. 1 and 2, the cover ventilation part 250 is formed in the cover body 210 so that the through part 220 can communicate fluidly with the outside through the outer wall of the cover body 210. In this case, the cover ventilation part 250 is formed by being recessed downward from the upper end of the cover body 210. Accordingly, fluid communication between the through part 220 of the cover body 210 and the outside of the cover body 210 is possible.

In this case, as shown in FIG. 2, a plurality of cover ventilation parts 250 may be formed on the front and rear surfaces of the cover body 210 and may extend to an end of the first guide part 230 formed on the cover body 210. Accordingly, the area through which the through part 220 and the outside can communicate with each other is widened.

In this case, the first support member ventilation part 350 is formed in a shape corresponding to the cover ventilation part 250 in the support member 300. More specifically, the first support member ventilation part 350 is formed so that the first support member ventilation part 350 and the cover ventilation part 250 can be disposed side by side in the same position in a state where the cover 200 is located in the second position.

As shown in FIGS. 1 and 2, as the cover ventilation part 250 is formed on the front and rear surfaces of the cover body 210, a second support member ventilation part 360 is formed on the left and right surfaces of the support member 300. The second support member ventilation part 360 is formed through the second support part 320 of the support member 300.

The second support member ventilation part 360 is formed at a position corresponding to a space formed between the lower end of the cover body 210 and the upper end of the base body 110 in a state where the cover 200 is located in the second position.

Like the first support member ventilation part 350, the second support member ventilation part 360 serves to connect the through part 220 and the outside in a fluid communication manner. However, the second support member ventilation part 360 is opened only when the cover 200 is located in the second position, and when the cover 200 is located in the first position, some or all of the left and right surfaces of the cover body 210 may be closed.

As described above, preferred embodiments according to the present invention have been examined, and it is obvious to those skilled in the art that the present invention can be embodied in other specific forms without departing from the spirit or scope of the present invention in addition to the above-described embodiments. Therefore, the above-described embodiments are to be construed as illustrative rather than restrictive, and accordingly, the present invention is not limited to the above description and may be modified within the scope of the appended claims and their equivalents.

What is claimed is:

1. A test socket energizably connected to a semiconductor device to electrically test the semiconductor device, the test socket comprising:
   a base on which a seating part on which the semiconductor device is seated is formed and a test pin protruding from the seating part in one direction, the test pin contactable with a conductive part of the semiconductor device, and a guide wall for guiding the semiconductor device protrudes upward around the seating part;
   a cover configured to reciprocate a first position located at an end of the base in the one direction and a second position located apart from the first position in the one direction; and
   a support member coupled to the base and supporting an outer surface of the cover,
   wherein the cover comprises:
     a cover body:
     a through part formed through the cover body in the one direction so that the semiconductor device is seatable in the seating part; and
     a first guide part extending from one side of the cover body to an other direction that opposes the one direction, and
   wherein the base comprises:
     a base body having the seating part formed on one surface of the base body; and
     a first guide groove recessed from an outer surface of one side of the base body, wherein the first guide groove is configured to guide motion of the cover in the one direction or the other direction when the first guide part is inserted in the first guide groove, and
   wherein the support member comprises a first support part configured to support an outer surface of the first guide part and the outer surface of the one side of the base body while the cover reciprocates between the first position and the second position,
   wherein the first support part prevents the cover body from tilting in a direction other than the one direction or the other direction during movement of the cover body.

2. The test socket of claim 1, wherein the cover body and the first guide part are integrally formed by injection molding.

3. The test socket of claim 1, wherein the cover further comprises a guide protrusion protruding from an inner surface of the first guide part and extending in the one direction, and wherein the base further comprises a second guide groove further recessed from the first guide groove, wherein the second guide groove is configured to guide the motion in the one direction or the other direction when the guide protrusion is inserted in the second guide groove.

4. The test socket of claim 1, wherein the support member is configured to surround outer surfaces of the cover and the base.

5. The test socket of claim 4, wherein the support member extends in the one direction to an end of the cover in the one direction in a state when the cover is located in the second position.

6. The test socket of claim 4,
   wherein the support member further comprises a latching protrusion protruding from an inner surface of the support member, and
   wherein the base further comprises a latching groove into which the latching protrusion is inserted so that the support member is fixed to the base.

7. The test socket of claim 6, wherein the support member further comprises an elastic providing hole disposed to surround a part of a circumference of the latching protrusion so that the latching protrusion is insertable into the latching groove.

8. The test socket of claim 1,
wherein the cover comprises a second guide part extending in the other direction from an other side of the cover body that is different from the one side of the cover body,
wherein the base further comprises a third guide groove recessed from an outer surface of an other side of the base body that is different from the one side of the base body, wherein the third guide groove is configured to guide the motion in the one direction or the other direction when the second guide part is inserted in the third guide groove, and
wherein the support member comprises a second support part disposed to support an outer surface of the second guide part and the outer surface of the other side of the base body while the cover reciprocates between the first position and the second position.

9. The test socket of claim 1, wherein the support member is formed of a material having a strength that is greater than a strength of the first guide part.

10. The test socket of claim 1, further comprising an elastic member disposed between the cover and the base, wherein the elastic member is configured to elastically press the cover in the one direction.

* * * * *